United States Patent
Matsushima et al.

(10) Patent No.: US 8,014,901 B2
(45) Date of Patent: Sep. 6, 2011

(54) MOBILE ROBOT CONTROL SYSTEM

(75) Inventors: Kuniaki Matsushima, Wako (JP);
Tadaaki Hasegawa, Wako (JP);
Yuichiro Kawaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 891 days.

(21) Appl. No.: 11/989,629

(22) PCT Filed: Jul. 10, 2006

(86) PCT No.: PCT/JP2006/313661
§ 371 (c)(1),
(2), (4) Date: Jan. 29, 2008

(87) PCT Pub. No.: WO2007/015351
PCT Pub. Date: Feb. 8, 2007

(65) Prior Publication Data
US 2011/0077776 A1 Mar. 31, 2011

(30) Foreign Application Priority Data
Aug. 1, 2005 (JP) .................................. 2005-222511

(51) Int. Cl.
G05B 15/00 (2006.01)
G05B 19/00 (2006.01)

(52) U.S. Cl. ...................................................... 700/264

(58) Field of Classification Search .................. 700/245, 700/265, 65, 247, 249, 253, 264; 318/568.12, 318/568.2, 568.23, 568.24; 701/23
See application file for complete search history.

(56) References Cited

U.S. PATENT DOCUMENTS
5,084,826 A  1/1992 Hariki et al.

FOREIGN PATENT DOCUMENTS

| JP | 09-285983 | 11/1997 |
|---|---|---|
| JP | 10-315170 | 12/1998 |
| JP | 11-073201 | 3/1999 |
| JP | 2002-273677 A | 9/2002 |
| JP | 2004-017248 A | 1/2004 |
| JP | 2005-111661 A | 4/2005 |
| WO | 02078915 A1 | 10/2002 |

OTHER PUBLICATIONS

Japanese Office Action application No. JP2005-222511 mailed Sep. 21, 2010.
European Search Report for international application No. 06768023. 1-2316/1918075 PCT/JP2006313661 issued Oct. 21, 2009.

*Primary Examiner* — Khoi Tran
*Assistant Examiner* — Harry Oh
(74) *Attorney, Agent, or Firm* — Squire, Sanders & Dempsey (US) LLP

(57) ABSTRACT

In a mobile robot control system, it is configured such that the robot generates time-series data sequentially at a predetermined time interval and transmits them to the external terminal, and the external terminal receives the transmitted time-series data and adds them to the motion command, such that the motion of the robot is determined based on the generated time-series data and the time-series data added to the motion command. With this, it becomes possible to prevent the robot from suddenly starting to move at the time when the communication between the external terminal which is a transmitting source of the motion command and the robot has recovered from disconnection, thereby enabling to avoid making the operator feel unnatural.

12 Claims, 11 Drawing Sheets

MOBILE ROBOT CONTROL SYSTEM

TECHNICAL FIELD

This invention relates to a mobile robot control system, particularly to a system for remote-controlling a mobile robot.

BACKGROUND ART

As a system for remote-controlling a mobile robot, a technique taught by Patent Reference 1 can be given as an example. In the technique described in Patent Reference 1, when the communication between the mobile robot and an external terminal which is a transmitting source of motion command is failed, the mobile robot is configured to be controlled to move to a position which enables it to communicate with the external terminal based on a communication history, such that the mobile robot moves only within a predetermined area.

Patent Reference 1: Japanese Laid-Open Patent Application No. 2002-273677 (paragraph 0007, etc.)

DISCLOSURE OF THE INVENTION

Problems to be Solved by the Invention

In the case that the communication between the external terminal and mobile robot is disconnected, motion command that has not been received by the mobile robot is held in the external terminal. When the communication has recovered, the held motion command is received by the mobile robot so that the robot starts moving. However, the motion suddenly starts independently of the operator's intention, thereby causing unnatural feeling of the operator.

Therefore, an object of this invention is to overcome the aforesaid drawback and provide a mobile robot control system that prevents a mobile robot from suddenly starting to move at the time when the communication between an external terminal which is a transmitting source of motion command and the mobile robot has recovered from disconnection, thereby enabling to avoid making the operator feel unnatural.

Means for Solving the Problems

In order to achieve the object, this invention is configured to have a system for controlling a mobile robot having an external terminal that generates motion command and transmits it to the robot, and controlling means provided at the robot for controlling operation of the robot based on the transmitted motion command, characterized in that: the robot is provided with time-series data generating means for generating time-series data sequentially at a predetermined time interval and for transmitting them to the external terminal; and the external terminal is provided with time-series data adding means for receiving the transmitted time-series data and for adding them to the motion command; and the controlling means determines the motion of the robot based on the generated time-series data and the time-series data added to the motion command, and controls the motion of the robot in accordance with the transmitted motion command when a difference between a current one of the time-series data generated by the time-series data generating means and the time-series data added to the motion command is equal to or smaller than a predetermined value, and discontinues the motion of the robot when the difference is greater than the predetermined value.

This invention is configured to have a system for controlling a mobile robot having an external terminal that generates motion command and transmit it to the robot, and controlling means provided at the robot for controlling operation of the robot based on the transmitted motion command, characterized in that: the robot is provided with time-series data generating means for generating time-series data sequentially at a predetermined time interval and for transmitting them to the external terminal; and the external terminal is provided with time-series data storing means for receiving the transmitted time-series data and storing them; communication condition discriminating means for discriminating that communication condition between the external terminal and the robot is normal when the transmitted time-series data are received, and for discriminating that the communication condition is faulty when the transmitted time-series data are not received; motion command storing means for storing the motion command by adding the stored transmitted time-series data thereto, when the communication condition discriminating means discriminates that the communication condition is faulty; and transmission determining means for determining as to whether the stored motion command should be transmitted to the robot based on the time-series data added to the stored motion command and a current one of the received time-series data, when the communication condition discriminating means discriminates that the communication condition is normal.

This invention is configured such that the transmission determining means determines that the transmission of the stored motion command should be discontinued, when a difference between the time-series data added to the motion command and the current one of the received time-series data is greater than a predetermined value.

This invention is configured such that the external terminal further includes: motion command deleting means for deleting the motion command whose transmission was discontinued.

This invention is configured such that the external terminal further includes: signal generating means for generating a communication confirming signal at a predetermined second time interval and send it to the robot; and the robot includes: second communication condition discriminating means for discriminating that the communication condition is normal when the transmitted communication confirming signal is received, and for discriminating that the communication condition is faulty when the transmitted communication confirming signal is not received; and time interval changing means for changing the predetermined second time interval based on discrimination result of the second communication condition discriminating means.

This invention is configured such that the time interval changing means shortens the predetermined second time interval when the second communication condition discriminating means discriminates that the communication condition is faulty.

This invention is configured such that the robot further includes: positional information generating means for generating positional information of the robot and transmitting it to the external terminal; and the external terminal includes: displaying means for receiving the transmitted positional information and for displaying it.

This invention is configured such that the robot comprises a humanoid robot having a body, two legs connected to the body and two arms connected to the body, that moves by driving the legs.

Effects of the Invention

In the mobile robot control system, since it is configured such that the robot generates time-series data sequentially at a predetermined time interval and transmits them to the external terminal, and the external terminal receives the transmitted time-series data and adds them to the motion command, such that the motion of the robot is determined based on the generated time-series data and the time-series data added to the motion command, and the motion of the robot is controlled in accordance with the transmitted motion command when a difference between a current one of the time-series data generated by the time-series data generating means and the time-series data added to the motion command is equal to or smaller than a predetermined value, and the motion of the robot is discontinued when the difference is greater than the predetermined value, it becomes possible to prevent the robot from suddenly starting to move at the time when the communication between the external terminal which is a transmitting source of the motion command and the robot has recovered from disconnection, thereby enabling to avoid making the operator feel unnatural.

In the mobile robot control system, since it is configured such that the robot generates time-series data sequentially at a predetermined time interval and transmits them to the external terminal, and the external terminal receives the transmitted time-series data to store them, discriminates that communication condition between the external terminal and the robot is normal when the transmitted time-series data are received, whereas discriminating that the communication condition is faulty when the transmitted time-series data are not received, stores the motion command by adding the stored transmitted time-series data thereto, when the communication condition is discriminated to be faulty, and determines as to whether the stored motion command should be transmitted to the robot based on the time-series data added to the stored motion command and a current one of the received time-series data, when the communication condition is discriminated to be normal, it becomes possible to prevent the robot from suddenly starting to move at the time when the communication between the external terminal which is a transmitting source of the motion command and the robot has recovered from disconnection, thereby enabling to avoid making the operator feel unnatural.

In the mobile robot control system, since it is configured such that the transmission of the stored motion command is discontinued, when a difference, more specifically a difference in time between the time-series data added to the motion command and the current one of the received time-series data is greater than a predetermined value, it becomes possible to prevent the robot from suddenly starting to move at the time when the communication between the external terminal and the robot has recovered from disconnection, thereby enabling to avoid making the operator feel unnatural.

In the mobile robot control system, since it is configured such that the motion command whose transmission was discontinued is deleted, in addition to the effects mentioned above, it becomes possible to prevent a storage area of the motion command storage from being unnecessarily consumed.

In the mobile robot control system, since it is configured such that the external terminal generates a communication confirming signal at a predetermined second time interval and send it to the robot, and the robot discriminates that the communication condition is normal when the transmitted communication confirming signal is received, while discriminating that the communication condition is faulty when the transmitted communication confirming signal is not received, and changes the predetermined second time interval based on discrimination result, in addition to the effects mentioned above, it becomes possible to immediately determine as to whether the motion command should be transmitted to the robot when the communication between the external terminal and the robot has recovered from disconnection.

In the mobile robot control system, since it is configured such the predetermined second time interval is shortened when the communication condition is discriminated to be faulty, it becomes possible, as same as claim 6, to immediately determine as to whether the motion command should be transmitted to the robot when the communication between the external terminal and the robot has recovered from disconnection.

In the mobile robot control system, since it is configured such that the robot generates positional information of the robot and transmits it to the external terminal, and the external terminal receives the transmitted positional information and displays it, in addition to the effects, even when the operator cannot visually check the robot, he/she can operate the robot.

In the mobile robot control system, since it is configured such that the robot comprises a humanoid robot having a body, two legs connected to the body and two arms connected to the body, that moves by driving the legs, it becomes possible for the humanoid robot to obtain the effects mentioned above.

BEST MODES OF CARRYING OUT THE INVENTION

Preferred embodiments for carrying out a mobile robot control system according to the present invention will now be explained with reference to the attached drawings.

First embodiment

Figure 1:
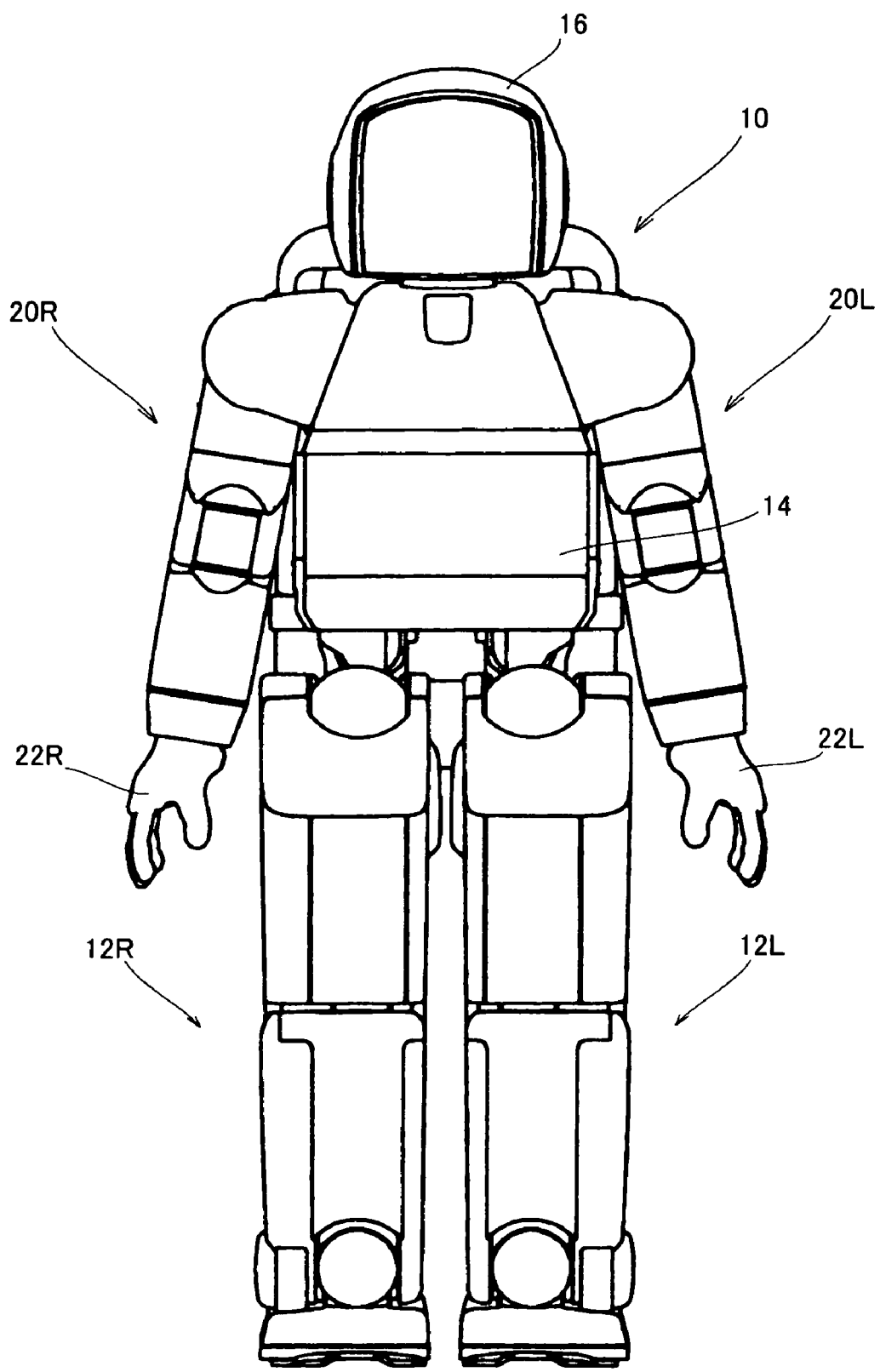
FIG. 1 is a front view of a robot to which a mobile robot control system according to a first embodiment of the invention is mounted.
Figure 2:
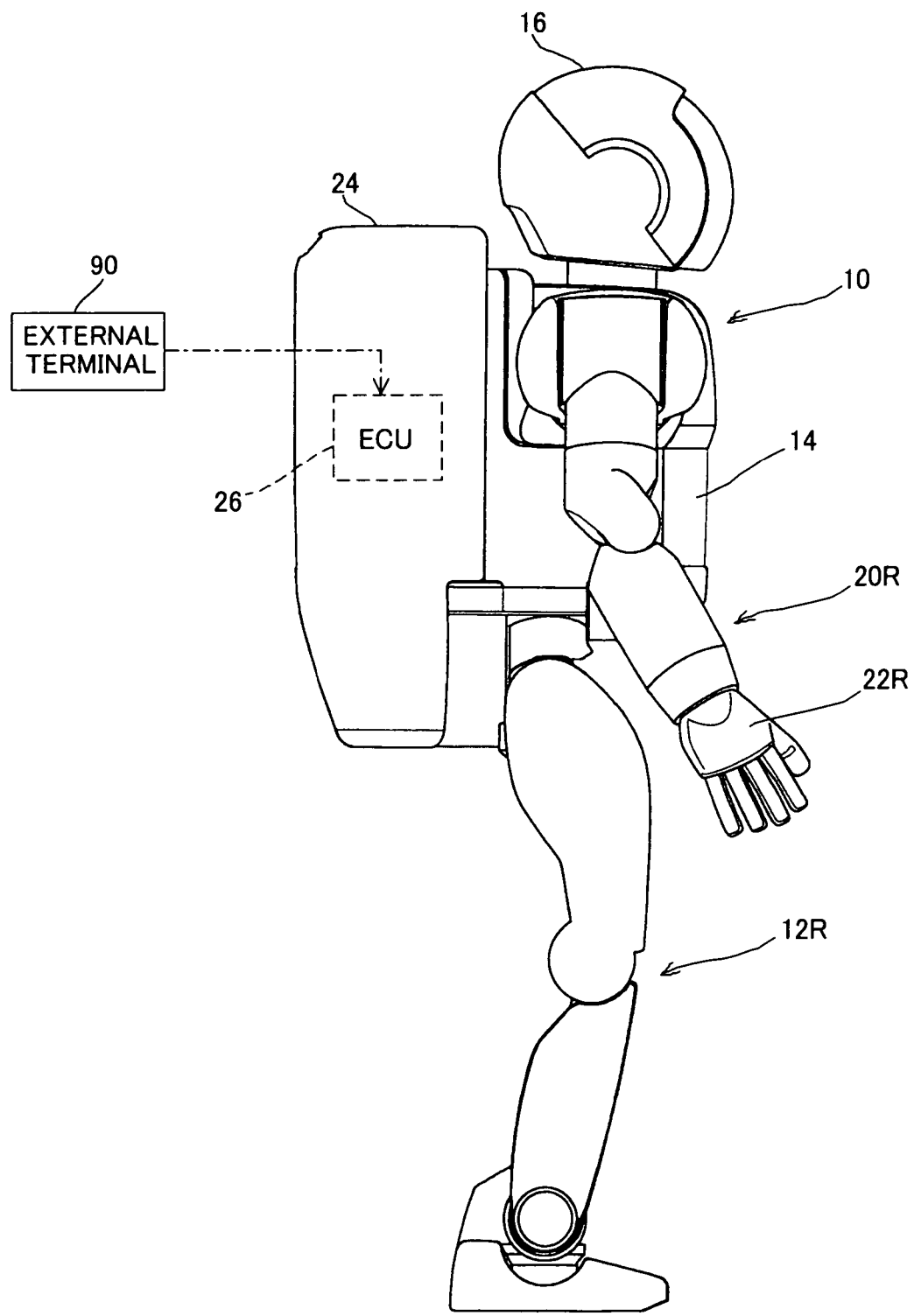
FIG. 2 is a side view of the robot shown in FIG. 1.

FIG. 1 is a front view of a robot to which a mobile robot control system according to a first embodiment of the invention is mounted and FIG. 2 is a side view of the robot shown in FIG. 1. It should be noted that, in the embodiments a humanoid legged mobile robot having a body and two legs and two arms connected thereto, which moves by driving the two legs (walks on two legs), is taken as an example of the mobile robot.

As shown in FIG. 1, the mobile robot (hereinafter referred to as "robot") 10 is equipped with right and left legs 12R, 12L (R and L indicating the right and left sides; hereinafter the same). The legs 12R, 12L are connected to the lower end of a body 14. A head 16 is connected to the upper end of the body 14 and right and left arms 20R, 20L are connected to opposite sides of the body 14. Hands 22R, 22L are attached to the distal ends of the right and left arms 20R, 20L.

As shown in FIG. 2, a housing unit 24 is mounted on the back of the body 14 for accommodating an electronic control unit (hereinafter referred to as "ECU") 26, a battery (not shown) and the like.

Figure 3:
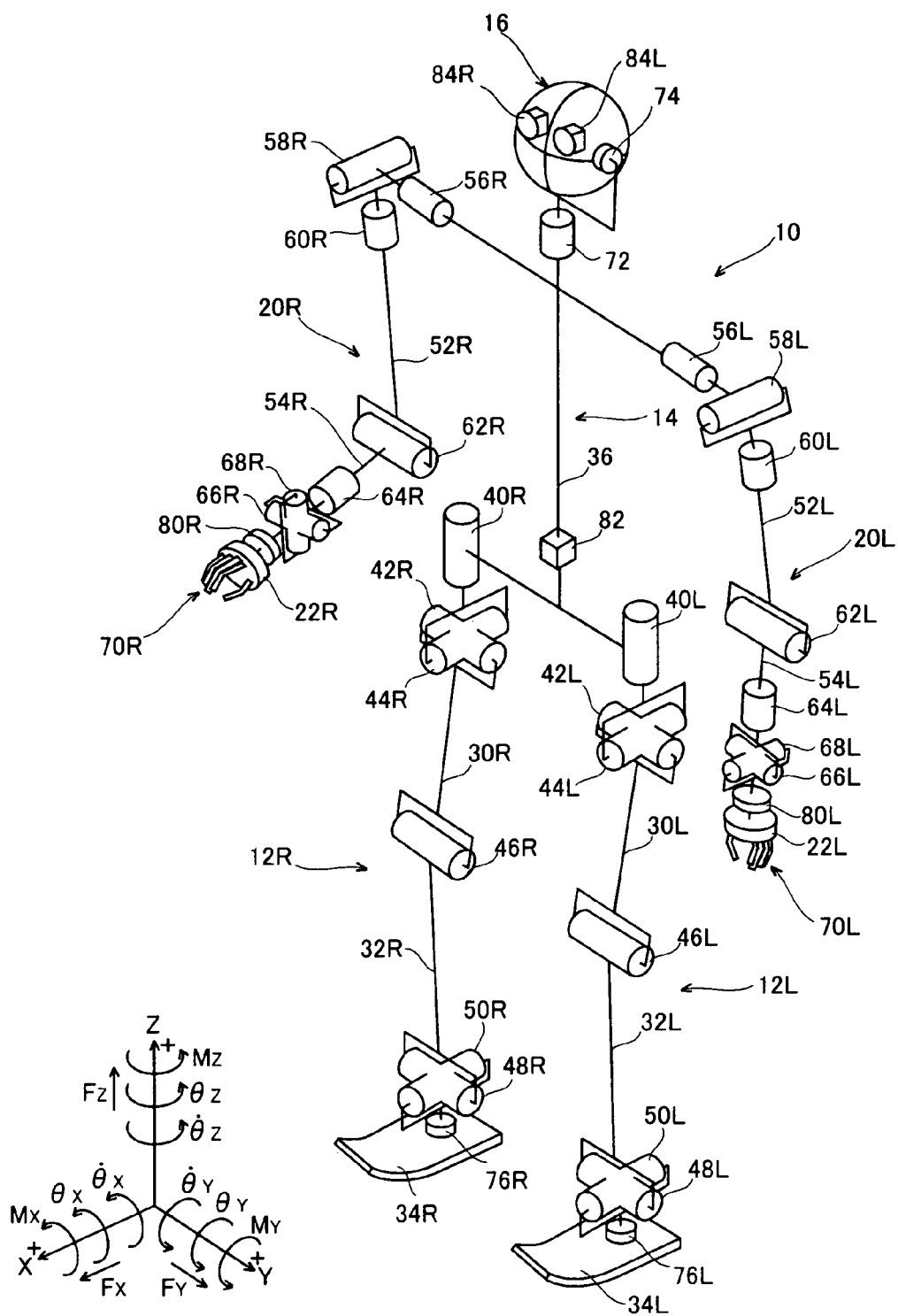
FIG. 3 is an explanatory view showing a skeletonized view of the robot shown in FIG. 1.

FIG. 3 is an explanatory view showing a skeletonized view of the robot 10 shown in FIG. 1. The internal structures of the robot 10 will be explained with reference to FIG. 3, with primary focus on the joints.

The right and left legs 12R, 12L are equipped with thigh links 30R, 30L, shank links 32R, 32L and feet 34R, 34L. The thigh links 30R, 30L are connected to the body 14 through hip (crotch) joints. The body 14 is represented in FIG. 3 simply by a body link 36. The thigh links 30R, 30L and shank links 32R, 32L are interconnected by knee joints, and the shank links 32R, 32L and feet 34R, 34L are interconnected by ankle joints.

The hip joints are constituted of rotary shafts 40R, 40L rotating about the Z axis (yaw axis; specifically in the height direction of the robot 10), rotary shafts 42R, 42L rotating about the Y axis (pitch axis; specifically in the lateral direction of the robot 10), and rotary shafts 44R, 44L rotating about the X axis (roll axis; specifically in the back-and-forth direction of the robot 10). The hip joints are each provided with 3 degrees of freedom.

The knee joints are constituted of rotary shafts 46R, 46L rotating about the Y axis and each provided with 1 degree of freedom. The ankle joints are constituted of rotary shafts 48R, 48L rotating about the Y axis and rotary shafts 50R, 50L rotating about the X axis and each provided with 2 degrees of freedom. Thus the right and left legs 12R, 12L are each provided with 6 rotary shafts (6 degrees of freedom) constituting the three joints, i.e., the whole legs are provided with a total of 12 rotary shafts.

The legs 12R, 12L are driven by actuators (not shown). Specifically, the actuators driving the legs 12R, 12L comprise 12 electric motors disposed at appropriate positions in the body 14 and legs 12R, 12L and drive the 12 rotary shafts individually or separately. Owing to the foregoing configuration, the legs 12R, 12L can be imparted with desired movements by controlling the operation of the motors to drive the rotary shafts to appropriate angles.

The right and left arms 20R, 20L are equipped with upper arm links 52R, 52L, forearm links 54R, 54L and the hands 22R, 22L. The upper arm links 52R, 52L are connected through shoulder joints to the body 14. The upper arm links 52R, 52L and forearm links 54R, 54L are interconnected by elbow joints and the forearm links 54R, 54L and hands 22R, 22L are interconnected by wrist joints.

The shoulder joints are constituted of rotary shafts 56R, 56L rotating about the Y axis, rotary shafts 58R, 58L rotating about the X axis and rotary shafts 60R, 60L rotating about the Z axis and each provided with 3 degrees of freedom. The elbow joints are constituted of rotary shafts 62R, 62L rotating about the Y axis and each provided with 1 degree of freedom. The wrist joints are constituted of rotary shafts 64R, 64L rotating about the Z axis, rotary shafts 66R, 66L rotating about the Y axis and rotary shafts 68R, 68L rotating about the X axis and each provided with 3 degrees of freedom. Thus the right and left arms 20R, 20L are each provided with 7 rotary shafts (7 degrees of freedom) constituting the three joints, i.e., the whole arms are provided with a total of 14 rotary shafts.

Similar to the legs 12R, 12L, the arms 20R, 20L are also driven by actuators (not shown). Specifically, the actuators driving the arms 20R, 20L comprise 14 electric motors disposed at appropriate positions in the body 14 and arms 20R, 20L and drive the 14 rotary shafts individually or separately. Owing to the foregoing configuration, the arms 20R, 20L can be imparted with desired movements by controlling the operation of the motors to drive the rotary shafts to appropriate angles.

The each hand 22R(22L) is equipped with five fingers 70R(70L). Each of the fingers 70R, 70L is freely driven by a drive mechanism (having actuators; not shown) and can be operated to grasp an object, for instance, in cooperation with the movement of arms 20R, 20L.

The head 16 is connected to the body 14 through a neck joint. The neck joint is constituted of a rotary shaft 72 rotating about the Z axis and a rotary shaft 74 rotating about the Y axis and is provided with 2 degrees of freedom. The rotary shafts 72 and 74 are also driven by actuators (electric motors; not shown) individually or separately.

Six-axis force sensors 76R, 76L are attached to the right and left legs 12R, 12L (specifically, between the feet 34R, 34L and ankle joints), respectively. The six-axis force sensors 76R, 76L produce outputs or signals indicative of the floor reaction force components Fx, Fy and Fz of three directions and the moment components Mx, My and Mz of three directions acting on the legs 12R, 12L (specifically, acting on the robot 10 through the legs 12R, 12L) from the surface of contact.

Similar six-axis force sensors 80R, 80L are attached to the right and left arms 20R, 20L (specifically, between the hands 22R, 22L and wrist joints), respectively. The six-axis force sensors 80R, 80L produce outputs or signals indicative of the external force components Fx, Fy and Fz of three directions and the moment components Mx, My and Mz of three directions acting on the arms 20R, 20L (specifically, acting on the robot 10 through the arms 20R, 20L).

An inclination sensor 82 is installed on the body 14 and produces an output or signal representing at least one of the inclination (tilt angle) of the body 14 relative to the vertical axis and the angular velocity thereof, i.e., representing at least one quantity of state such as the inclination (posture) of the body 14. The interior of the head 16 is mounted therein with right and left CCD cameras 84R, 84L respective of which takes an image of the surrounding of the robot 10 and simultaneously output the taken images.

The outputs from the sensors and the cameras are sent to the ECU 26 shown in FIG. 2. The ECU 26 comprises a microcomputer having a CPU, an input/output circuit, a ROM, a RAM and the like (none of which are shown), and is freely communicated with an external terminal 90.

Figure 4:
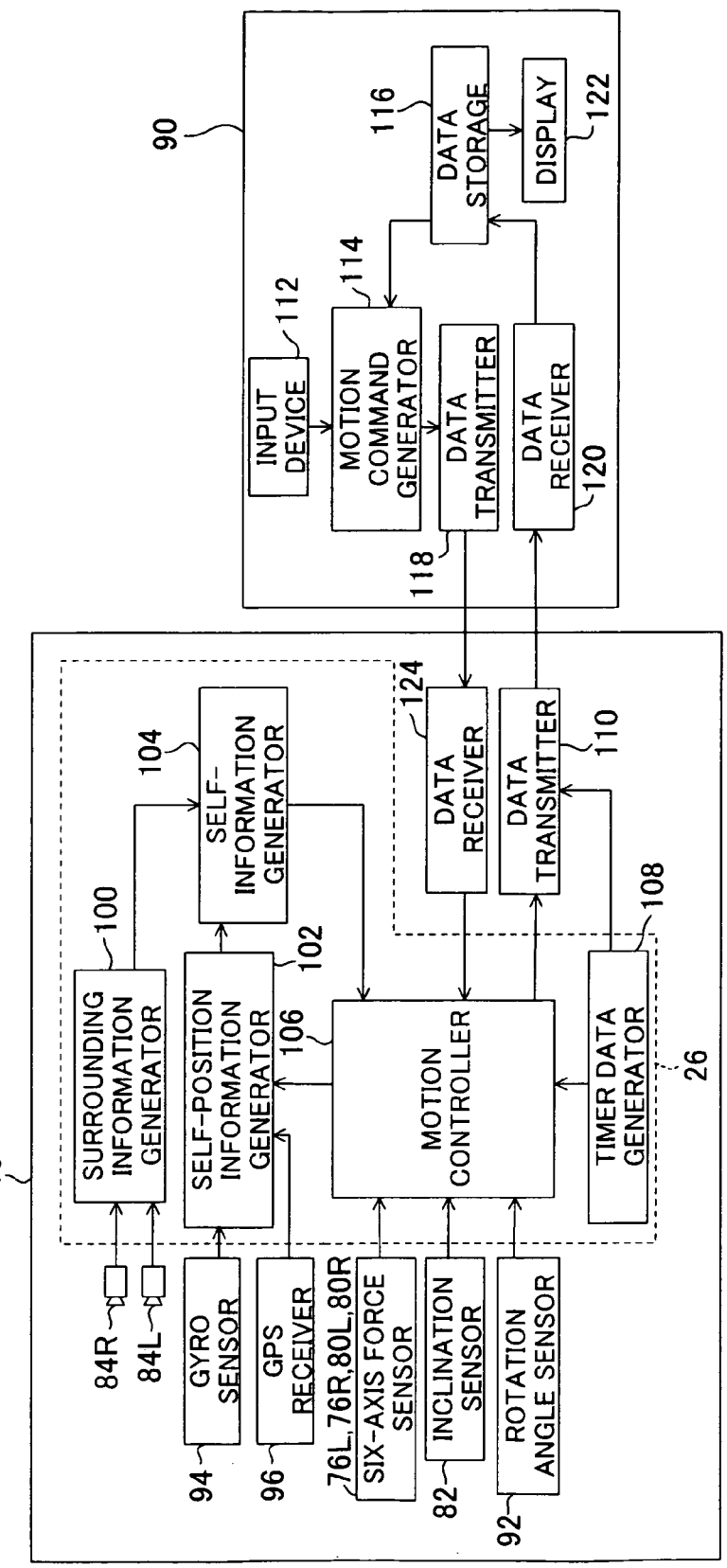
FIG. 4 is a block diagram functionally showing the structures of the robot and an external terminal shown in FIG. 2, and the operation thereof.

FIG. 4 is a block diagram functionally showing the structure of the robot 10 and external terminal 90, and the operation thereof.

As shown in FIG. 4, the robot 10 having the sensors and cameras mentioned in the foregoing is further equipped with rotation angle sensors 92, a gyro sensor 94 and a GPS receiver 96. The rotation angle sensors 92 are constituted of a number of rotary encoders that produce outputs or signals indicative of the rotation angles of the aforesaid rotary shafts (i.e., operation amounts of the motors). The gyro sensor 94 produces an output or signal indicative of the moving distance and direction of the robot 10. The GPS receiver 96 receives radio signals transmitted from satellites to acquire information about the position (latitude and longitude) of the robot 10.

The ECU 26 is equipped with a surrounding information generator 100, self-position information generator 102, self-information generator 104, motion controller 106 and timer data generator 108. The surrounding information generator 100 is inputted with the image acquired by the CCD cameras 84R, 84L to produce information about the surroundings of the robot 10. Specifically, it produces three-dimensional distance data based on the brightness of the acquired image taken by the CCD cameras 84R, 84L, extracts clusters representing an obstacle(s) from the distance data by using, for instance, the histogram processing, and extracts an amount of characteristics such as an average position, size and the like of the obstacles in the real space from the extracted clusters to generate an obstacle map of the surroundings of the robot 10. Since the technique related to the obstacle detection is described in detail in Japanese Laid-Open Patent Application Nos. 2001-242934 and 2002-286416 proposed earlier by the applicant, the further explanation is omitted.

The self-position information generator 102 produces current positional information of the robot 10 based on positional information inputted from the GPS receiver 96. When the GPS receiver 96 is not able to receive radio wave transmitted from satellites, it produces the current positional information based on the moving direction and distance of the robot 10 detected by the gyro sensor 94. The current positional information may be produced based on the amount of motion of the robot 10 detected by the rotation angle sensors 92 or control values (explained later) of the motors sent from the motion controller 106.

The self-information generator 104 produces self-information such as a self-position relative to an obstacle based on the surrounding information (obstacle map) of the robot 10 produced by the surrounding information generator 100 and the current positional information of the robot 10 produced by the self-position information generator 102. The self-information produced by the self-information generator 104 is forwarded to the motion controller 106.

The timer data generator 108 generates timer data (time-series data) sequentially at a predetermined time interval, i.e., 0.5 sec. The predetermined time interval will be hereinafter called the "timer data generating interval."

The timer data is data indicative of a time point (time when the timer data is generated) and can be expressed using an elapsed period from a certain time (e.g., 0.5 sec, 1.0 sec, 1.5 sec, . . . ) or using a variable that is updated based on a given rule at the timer data generating interval (e.g., 1, 2, 3, . . . ). In this embodiment, when timer data indicative of a certain time is defined as "timer data (n)," another timer data indicative of a time point after elapse of m times of the timer data generating interval from the time specified by the timer data (n), is defined as "timer data (n+m)." Specifically, timer data indicative of a time point 0.5 sec after a certain time point specified by timer data (n) is expressed with "timer data (n+1)" and timer data indicative of a time point 1 sec after the same is with "timer data (n+2)." The timer data generated by the timer data generator 108 is sent to the external terminal 90 through a data transmitter 110 disposed in the robot 10.

The external terminal 90 comprising a personal computer is located separately from the robot 10. The external terminal 90 is a transmitting source of motion command for the robot 10 and equipped with an input device (a keyboard or a mouse) 112 provided to be freely operable by the operator, motion command generator 114, data storage 116, data transmitter 118, data receiver 120 and display 122.

The data transmitter 118 and data receiver 120 can be freely communicated by radio with a data receiver 124 and the data transmitter 110 in the robot 10, respectively. To be specific, the radio communication is the socket communication utilizing the TCP (Transmission Control Protocol).

The timer data sent from the data transmitter 110 of the robot 10 is received by the data receiver 120 of the external terminal 90 and inputted to the data storage 116. The data storage 116 stores (memorizes) the latest value of the inputted timer data (the most recent value of the timer data received by the external terminal 90).

The motion command generator 114 of the external terminal 90 generates motion commands for the robot 10 based on the operation of the input device 112 by the operator. The motion command generated by the motion command generator 114 is added with timer data stored (memorized) in the data storage 116. The motion command and timer data added thereto are forwarded from the data transmitter 118 to the robot 10.

The motion command and timer data sent from the data transmitter 118 are received by the data receiver 124 of the robot 10 and inputted to the motion controller 106.

Based on timer data generated by the timer data generator 108 and another timer data added to the motion command, the motion controller 106 determines motion of the robot 10. Specifically, when a difference between the latest (current) timer data and another timer data added to the motion command, more precisely, a difference between a time indicated by the latest timer data and a time indicated by the timer data added to the motion command (i.e., a difference in terms of time), is equal to or less than a predetermined value, the motion controller 106 controls motion of the robot 10 in accordance with the motion command sent from the external terminal 90. The robot 10 is operated by calculating control values of the motors mounted on the robot 10 based on the motion command, self-information and outputs of the sensors and outputting the calculated control values to the motors to control the operations thereof. Although a technique described in, for example, Japanese Laid-Open Patent Application No. Hei 10(1998)-277969 earlier proposed by the applicant is applied as a locomotion control of the robot 10, it is not directly related to the gist of this invention, so will not be explained here.

On the other hand, when a difference between the latest timer data and the timer data added to the motion command exceeds the predetermined value, the operation of the robot 10 is discontinued. Specifically, in the case that it is the middle of motion of the robot 10, the motion is discontinued and the robot 10 is restored to initial state, while, in the case that the motion has not started yet, a posture of the robot 10 is maintained.

The motion controller 106 sends motion information of the robot 10 to the external terminal 90 through the data transmitter 110. The motion information contains a result of motion command execution processing of the robot 10 (explained later), position data (positional information, i.e., self-information such as self-position with respect to obstacles, produced by the self-information generator 104) and condition data (faulty information of the sensors, remaining charge of the battery (not shown) mounted on the robot 10, radio intensity of the socket communication, and other information).

The motion information sent from the robot 10 is received by the data receiver 120 and stored (memorized) with the aforementioned timer data in the data storage 116. Data (position data, condition data, motion command execution processing result) stored in the data storage 116 is displayed on the display 122 to inform the operator.

Figure 5:
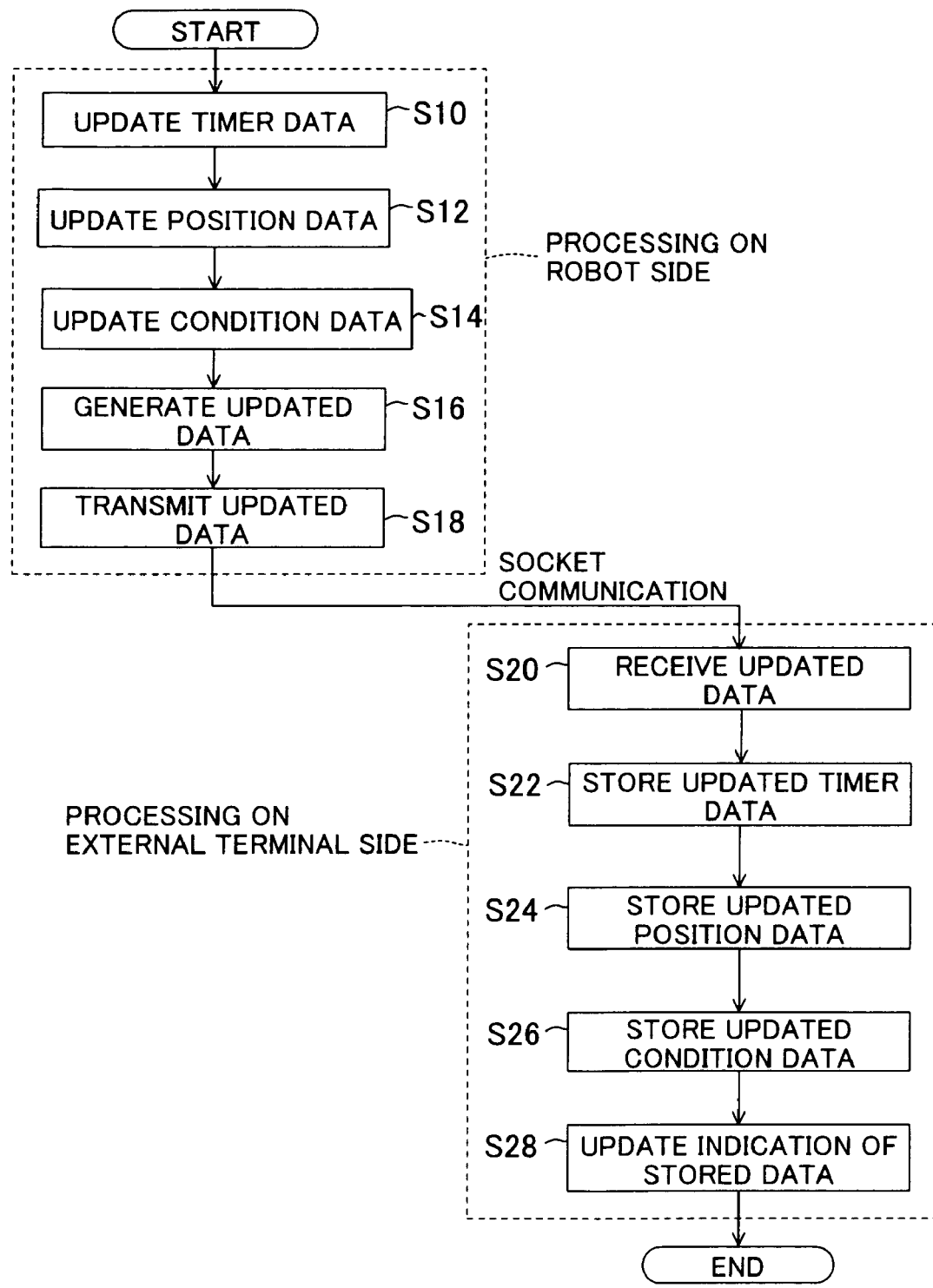
FIG. 5 is a flowchart showing sending and receiving processing of timer data and the like, executed between the robot and external terminal shown in FIG. 2.

Next, sending and receiving processing of timer data and other information, executed between the robot 10 and external terminal 90 will be explained. FIG. 5 is a flowchart showing the processing. In the following explanation, notifications in parentheses after step numbers denote the blocks in FIG. 4 corresponding to the executed processing.

The explanation of the flowchart in FIG. 5 will be made. First, in S10 (timer data generator 108), timer data is updated. Next, in S12 and S14 (motion controller 106 for both), position data and condition data is updated, in S16 (timer data generator 108, motion controller 106), updated data of the timer data, position data and condition data is generated and in S18 (data transmitter 110), the updated data is transmitted. The foregoing processing of S10 to S18 is executed on the side of the robot 10.

In S20 (data receiver 120), the updated data is received, and in S22 to S26 (data storage 116 for each), the updated data (timer data, position data, condition data) is stored (memorized). The program then proceeds to S28 (display 122), the indication of the stored data is updated. The foregoing processing of S20 to S28 is executed on the side of the external terminal 90. This processing is performed when the socket communication with the robot 10 functions normally, while it is not performed when the socket communication is blocked for some reason. In other words, when the socket communication is blocked, timer data and other data stored in the data storage 116 of the external terminal 90 is not updated.

Figure 6:
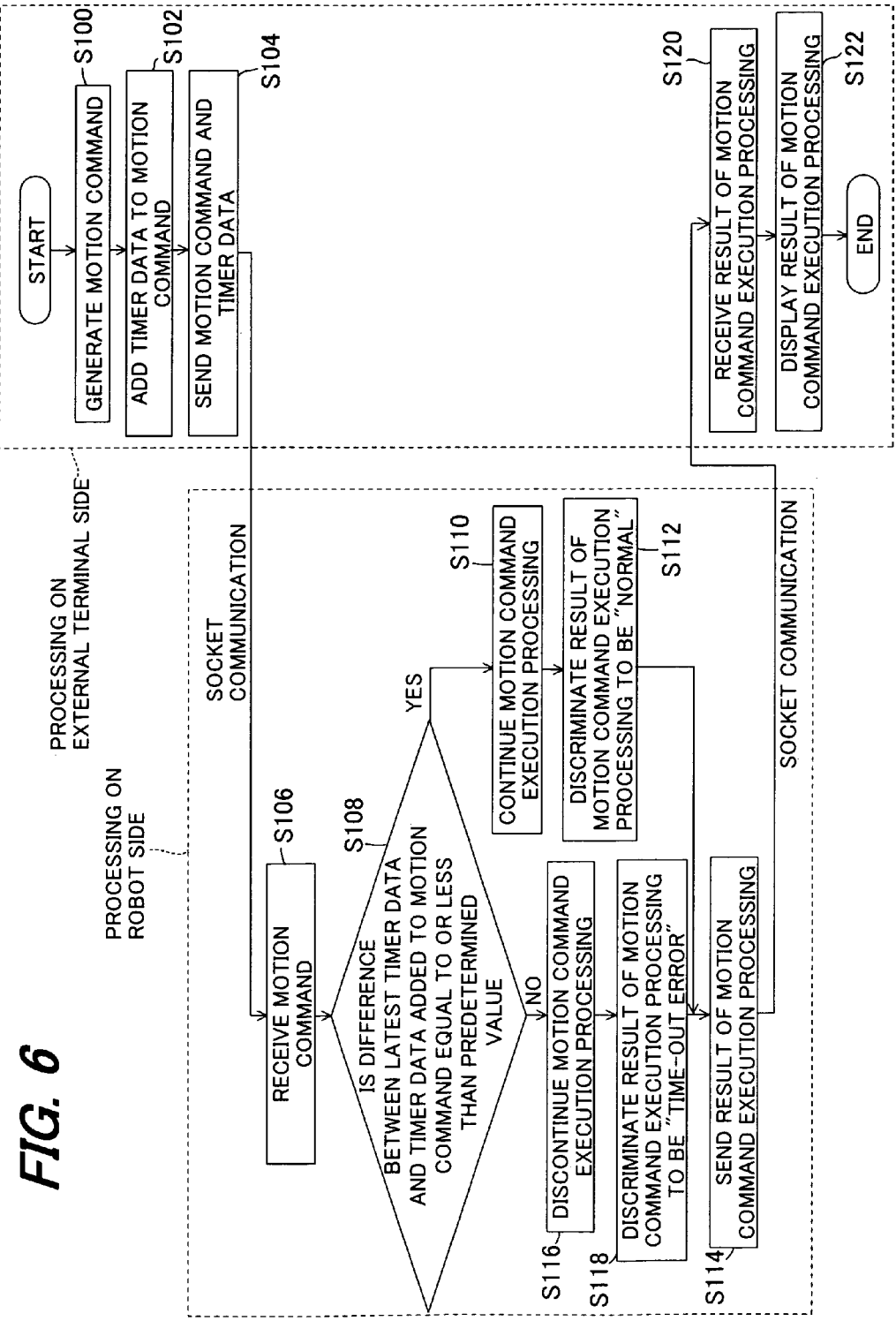
FIG. 6 is a flowchart showing motion control processing of the robot executed by the robot and external terminal shown in FIG. 2.

Next, motion control processing of the robot 10 executed by the robot 10 and external terminal 90 will be explained. FIG. 6 is a flowchart showing the processing.

Explaining the flowchart of FIG. 6, first in S100 (motion command generator 114), motion command for the robot 10 is generated in response to the operation of the input device 112 by the operator. The program proceeds to S102 (motion command generator 114, data storage 116), in which timer data stored in the data storage 116 is added to the generated motion command, and to S104 (data transmitter 118), in which the generated motion command and the timer data added thereto are sent to the robot 10 via the socket communication. The foregoing processing of S100 to S104 is executed on the external terminal 90 side.

Then, in S106 (data receiver 124), the sent motion command and timer data added thereto are received, whereafter in S108 (motion controller 106), it is determined whether a difference between a time specified by latest (current) timer data generated by the timer data generator 108 and a time specified by the timer data added to the motion command is equal to or less than a predetermined value (predetermined time period). In this embodiment, the predetermined value is set to 2.0 sec. Specifically, when the timer data added to the motion command is the timer data (n), a value of the latest timer data within a range from the timer data (n) to timer data (n+4) makes the determination result of S108 affirmative.

When the result in S108 is Yes, the program proceeds to S110 (motion controller 106), in which the motion command execution processing is continued (or started). Here, the motion command execution processing is the processing of controlling motion of the robot 10 in response to an inputted motion command. Next, in S112 (motion controller 106), a result of the motion command execution processing is discriminated to be "normal" and in S114 (data transmitter 110), the result of the motion command execution processing is forwarded to the external terminal 90 via the socket communication. Thus the robot 10 is remote-controlled in response to the operation of the external terminal 90 (input device 112) by the operator.

On the other hand, when a result of S108 is No, the program proceeds to S116 (motion controller 106), in which the motion command execution processing is discontinued (or not started), to S118 (motion controller 106), in which a result of the motion command execution processing is discriminated to be "time out error," and then to S114, in which this result is sent to the external terminal 90. The foregoing processing of S106 to S118 is executed on the robot 10 side.

In S120 (data transmitter 120), the sent result of the motion command execution processing is received and in S122 (display 122), the received result of the motion command execution processing is displayed to inform the operator. The foregoing processing of S120 and S122 is executed on the external terminal 90 side.

It should be noted that, although in the flowcharts of FIGS. 5 and 6 the processing of the robot 10 and external terminal 90 is expressed as if it is a series of processing for ease of understanding, the processing on the robot 10 side and that on the external terminal 90 side are executed separately or independently.

Figure 7:
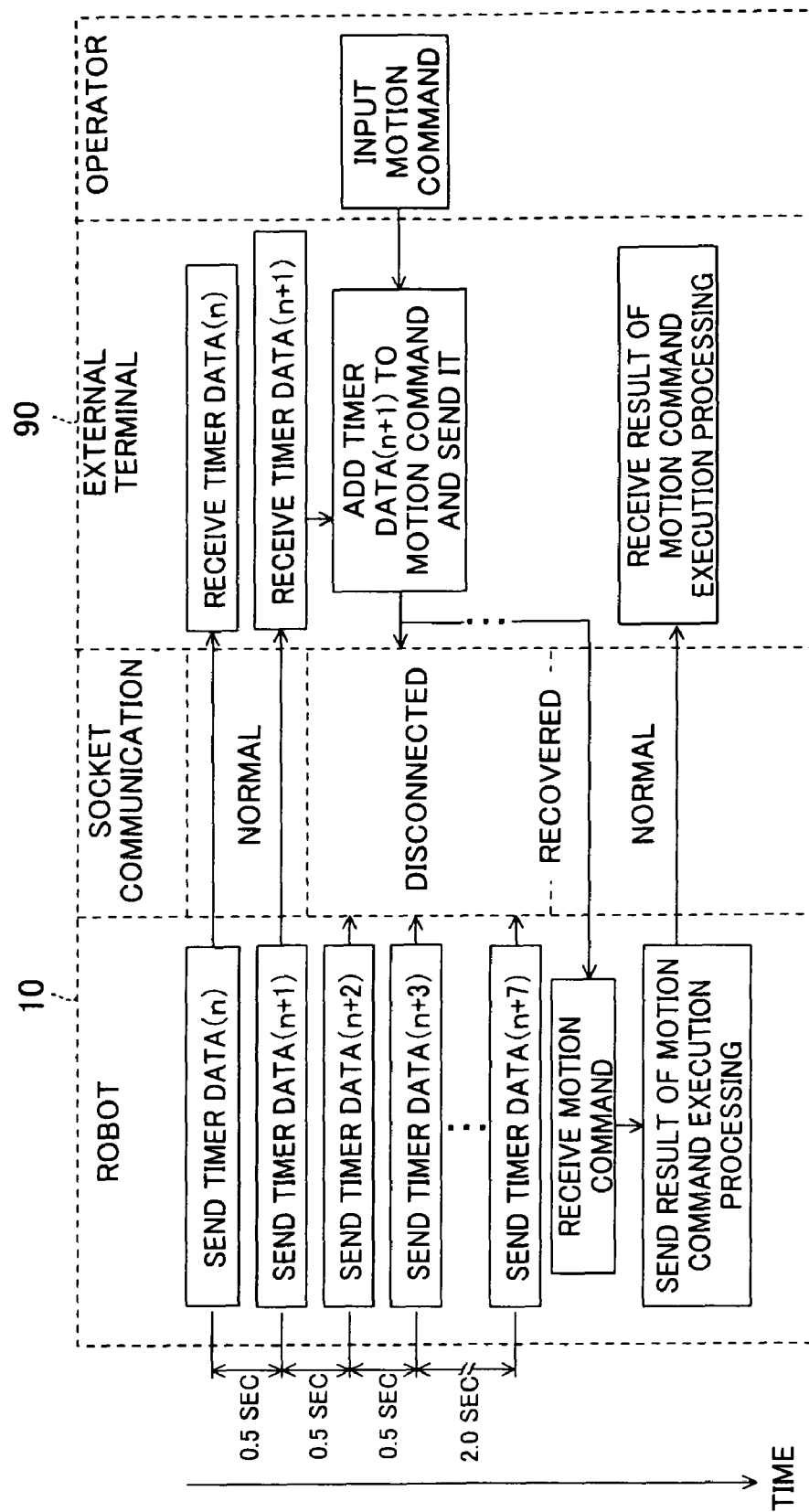
FIG. 7 is a time chart for expressing the sending and receiving processing of motion command and the timer data, executed between the robot and external terminal shown in FIG. 2.

Next, the processing in the flowcharts of FIGS. 5 and 6 will be explained again with reference to FIG. 7. FIG. 7 is a time chart for expressing the sending and receiving processing of motion command and timer data, executed between the robot 10 and external terminal 90.

As shown in FIG. 7, timer data sent from the robot 10 is received by the external terminal 90 when the socket communication 10 functions normally, and stored in the storage 116. When the socket communication is disconnected, the timer data sent from the robot 10 is not received by the external terminal 90. As a result, disconnection of the communication causes a difference between a time specified by the timer data stored in the external terminal 90 and a time specified by latest timer data generated in the robot 10. The difference represents a time period of disconnection of the communication and increases with increasing disconnected time period.

When being inputted with motion command through the input device 112 by the operator, the external terminal 90 adds the stored timer data to the inputted motion command and sends them to the robot 10. At this time, when the socket communication is disconnected, the motion command and timer data added thereto are not received by the robot 10 but held in the data transmitter 118 of the external terminal 90.

The held motion command and timer data are received by the robot 10 when the socket communication has recovered from disconnection. The motion controller 106 of the robot 10 determines whether a difference between a time specified by the received timer data and a time specified by latest timer data generated by the robot 10 is equal to or less than the predetermined value (2.0 sec). In the illustrated example, a time specified by the received timer data is (n+1) and a time specified by the latest timer data generated by the robot 10 is (n+7). Therefore, a difference therebetween, which is 3.0 sec, exceeds the predetermined value. Accordingly the motion controller 106 discontinues motion in accordance with the motion command and sends a result of the motion command execution processing as the time out error to the external terminal 90. The external terminal 90 receives the result (time out error) and displays it on the display 122 to inform the operator. With this indication, the operator recognizes that the inputted motion command was made invalid due to communication trouble.

Thus, in the mobile robot control system according to the first embodiment of the invention, it is configured to generate timer data sequentially at the timer data generating interval on the robot 10 side and send them to the external terminal 90 and, on the external terminal 90 side, add the sent timer data to motion command to be transmitted to the robot 10. Based on the generated timer data and timer data added to the motion command, the motion controller 106 determines motion of the robot 10, more specifically, when a difference between the generated latest timer data and timer data added to the motion command (i.e., time period of disconnection of the communication) is equal to or less than a predetermined value, it controls the motion of the robot 10 and when the difference exceeds the predetermined value, it discontinues the motion of the robot 10. Owing to this configuration, it becomes possible to prevent the robot 10 from suddenly starting to move at the time when the communication between the external terminal 90 which is a transmitting source of the motion command and the robot 10 has recovered from disconnection, thereby enabling to avoid making the operator feel unnatural.

In particular, in the case of a humanoid robot as the robot 10 according to this embodiment, equipped with the body 14 and the two legs 12R, 12L and two arms 20R, 20L connected to the body 14, if motion suddenly starts, it disadvantageously makes people around scared more than the case of a pet-type robot. Adoption of the configuration of this invention, however, can resolve such a disadvantage.

Further, it is configured to generate position data in the robot 10, send it to the external terminal 90 and receive the sent position data by the external terminal to display on the display 122. With this, even when the operator cannot visually check the robot 10, he/she can operate the robot 10 as viewing the display 122.

Second Embodiment

Next, a mobile robot control system according to a second embodiment of the invention will be explained.

Figure 8:
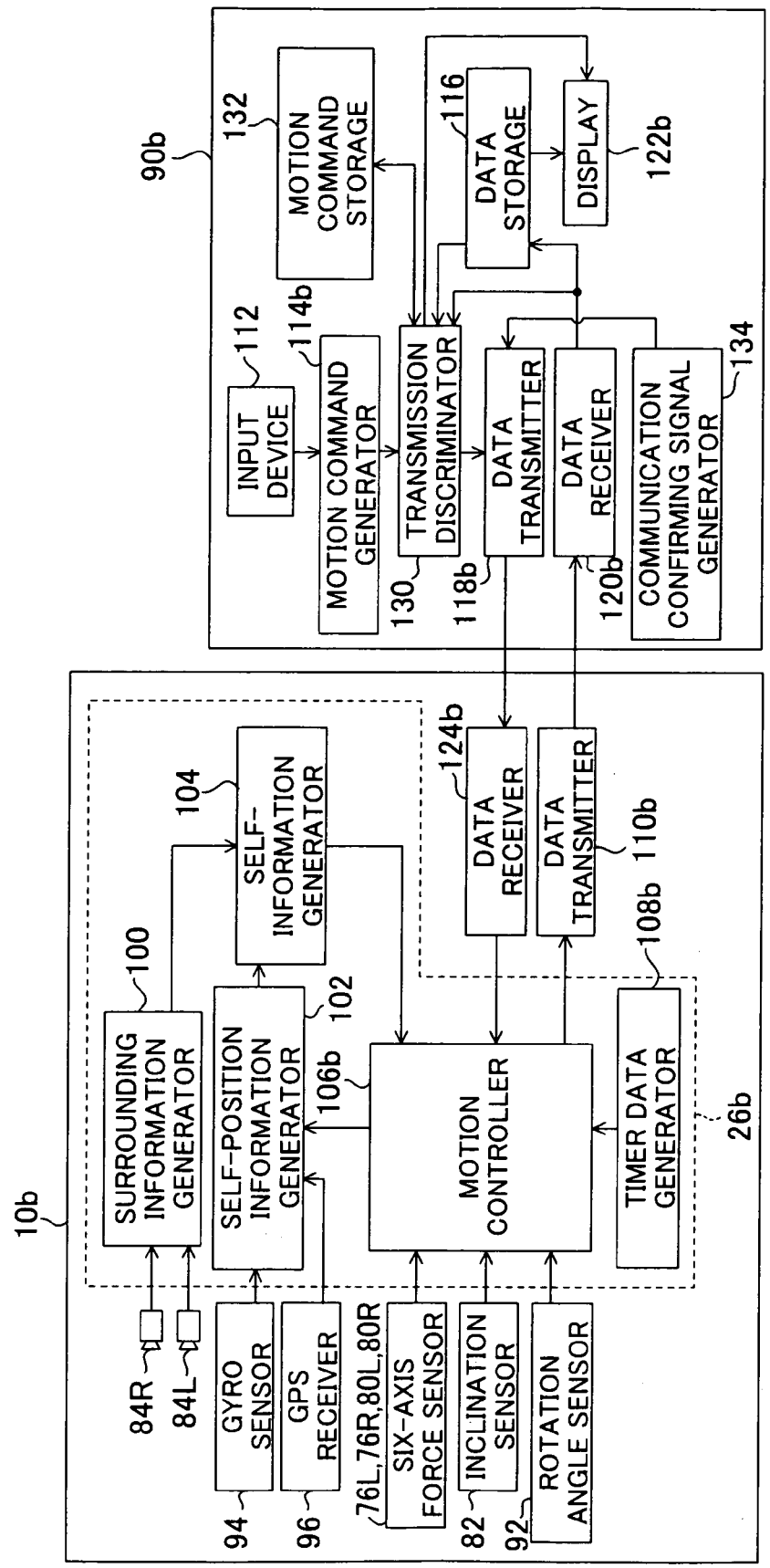
FIG. 8 is a block diagram similar to FIG. 4 but functionally showing the structure of a mobile robot control system according to a second embodiment of the invention and the operation thereof.

FIG. 8 is a block diagram similar to FIG. 4 but functionally showing the structure of a mobile robot control system (structures of a mobile robot and external terminal) according to the second embodiment of the invention and the operation thereof. In FIG. 8, the same constituent elements as those in the first embodiment are assigned by the same reference symbols and will not be explained. A part of the operations and treated data different from those in the first embodiment are suffixed at their symbols with b.

The explanation will be made with focus on points of difference from the first embodiment. As shown in FIG. 8, an ECU 26b of a robot 10b is equipped with the surrounding information generator 100, self-position information generator 102, self-information generator 104, a motion controller 106b and timer data generator 108b. The timer data generator 108b generates timer data each specifying a time at the timer data generating interval. In the second embodiment, the timer data is expressed by an elapsed time from a certain time point.

An external terminal 90b includes the input device 112 that is freely operable by the operator, a motion command generator 114b, the data storage 116, a data transmitter 118b, data receiver 120b, display 122b, transmission discriminator 130, motion command storage 132 and communication confirming signal generator 134.

Timer data generated by the timer data generator 108b at the timer data generating interval is sent from a data transmitter 110b to the external terminal 90b. The sent timer data is received by the data receiver 120b of the external terminal 90b and inputted to the data storage 116 and transmission discriminator 130. Based on the inputted timer data, the transmission discriminator 130 discriminates whether the external terminal 90b and robot 10b are properly communicated with each other (i.e., the socket communication functions normally).

Motion command generated by the motion command generator 114b is inputted to the transmission discriminator 130. When the communication is normal, the transmission discriminator 130 sends the inputted motion command to the robot 10b through the data transmitter 118b. The sent motion command is received by a data receiver 124b of the robot 10b and inputted to the motion controller 106b. The motion controller 106b controls motion of the robot 10b in accordance with the inputted motion command.

On the other hand, when the communication condition is faulty (when the socket communication is disconnected), the transmission discriminator 130 adds latest timer data stored in the data storage 116 to the motion command and stores (memorizes) the motion command and timer data added thereto in the motion command storage 132 (i.e., the motion command is not transmitted to the robot 10b).

When the communication has recovered from faulty condition, based on the timer data added to the motion command stored in the motion command storage 132 and latest timer data generated by the timer data generator 108b, the transmission discriminator 130 determines whether the stored motion command should be forwarded to the robot 10b.

The communication confirming signal generator 134 generates a communication confirming signal at a second predetermined time interval (0.5 sec in this embodiment). The second predetermined time interval will be hereinafter called the "communication confirming signal generating interval." The communication confirming signal generated by the communication confirming signal generator 134 is sent to the robot 10b through the data transmitter 118b. The sent communication confirming signal is received by the data receiver 124b and inputted to the motion controller 106b. Based on the inputted communication confirming signal, the motion controller 106b determines whether the robot 10b and external terminal 90b are properly communicated with each other and based on the determination result, changes the timer data generating interval.

Figure 9:
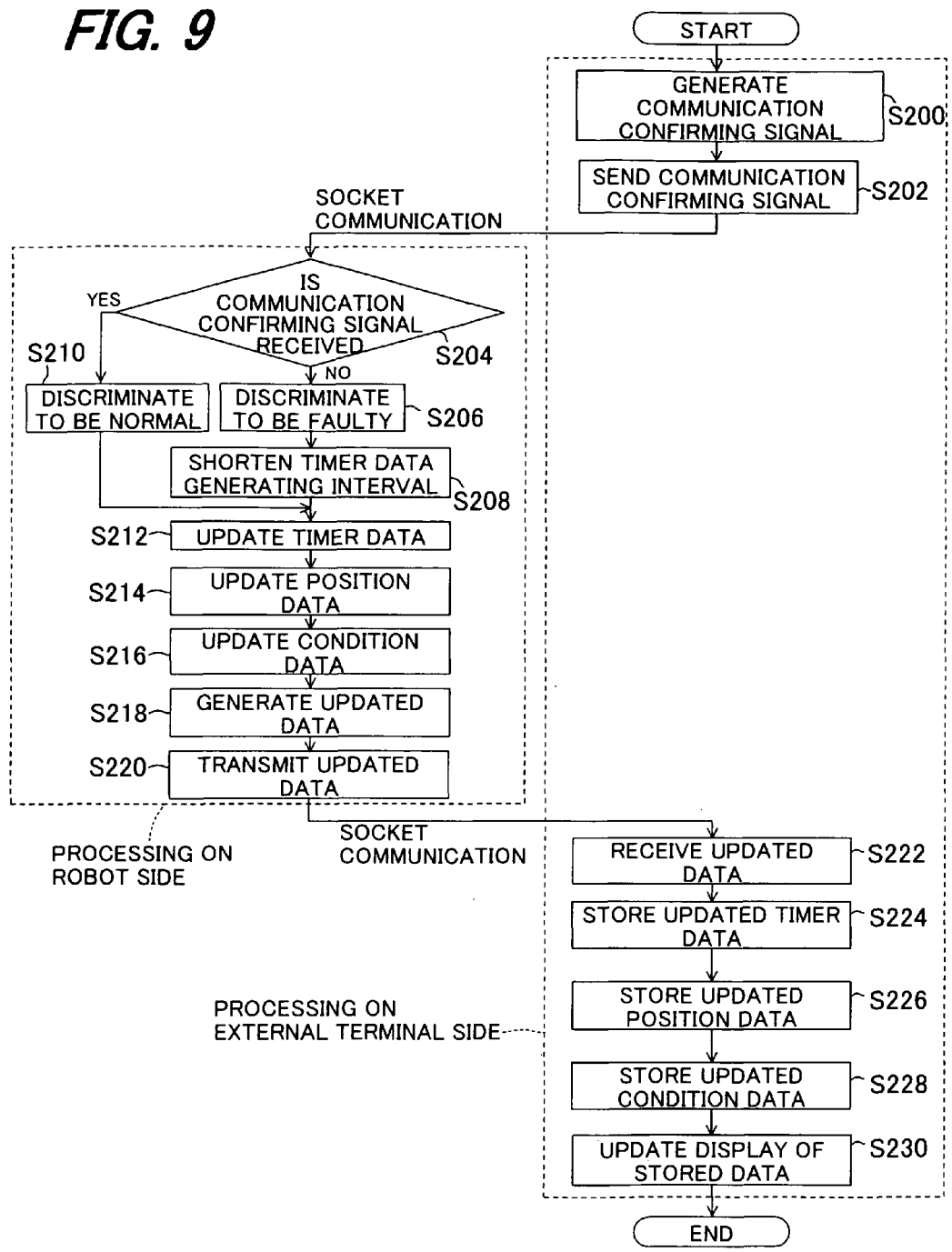
FIG. 9 is a flowchart showing sending and receiving processing of timer data and communication confirming signal, executed between a robot and external terminal shown in FIG. 8.

Next, sending and receiving processing of timer data and communication confirming signal, executed between the robot 10b and external terminal 90b will be explained. FIG. 9 is a flowchart showing the processing. In the following explanation, notifications in parentheses after step numbers denote the blocks in FIG. 8 corresponding to the executed processing.

The explanation of the flowchart in FIG. 9 will be made. In S200 (communication confirming signal generator 134), a communication confirming signal is generated at the communication confirming signal generating interval (0.5 sec) and in S202 (data transmitter 118b), the communication confirming signal is transmitted. The foregoing processing is executed on the side of the external terminal 90b.

Next, in S204 (motion controller 106b, data receiver 124b), it is determined whether the communication confirming signal is received. Specifically, in the processing of S204, the result is negative when the communication confirming signal has not been received continuously over a period exceeding the communication confirming signal generating interval, while is affirmative when the communication confirming signal is received at the communication confirming signal generating interval.

When the result in S204 is No, the program proceeds to S206 (motion controller 106b), in which it is discriminated that the communication condition between the robot 10b and external terminal 90b is faulty (the socket communication is disconnected), and to S208 (motion controller 106b), in which the timer data generating interval is shortened. The shortened timer data generating interval is set to 0.1 sec, for instance. In contrast, when the result in S204 is Yes, the program proceeds to S210 (motion controller 106b), in which the communication is discriminated to be normal and the processing of S208 is skipped. When the communication is discriminated to be normal, the timer data generating interval is set to 0.5 sec.

In S212 (timer data generator 108b), timer data is updated and in S214 and S216 (motion controller 106b for both), position data and condition data is updated. Next, in S218 (timer data generator 108b, motion controller 106b), updated data of the timer data, position data and condition data is generated, and in S220 (data transmitter 110b), the updated data is transmitted. The updated data is transmitted at every interval of 0.5 sec when the timer data generating interval is 0.5 sec and at every interval of 0.1 sec when the timer data generating interval is 0.1 sec. In other words, timer data is transmitted every time being generated. The foregoing processing of S204 to S220 is executed on the side of the robot 10b.

In S222 (data receiver 120b), the updated data is received, and in S224 to S228 (data storage 116b for each), the updated data is stored (memorized). The program then proceeds to S230 (display 122b), in which the display of the stored data is updated. The foregoing processing of S222 to S230 is the same as that of S20 to S28 in the flowchart of FIG. 5 explained in the first embodiment and executed on the side of the external terminal 90b.

It should be noted that, although in the flowchart of FIG. 9 the processing of the robot 10b and external terminal 90b is expressed as if it is a series of processing for ease of understanding, the processing on the robot 10b side and that on the external terminal 90b side are executed separately or independently.

Figure 10:
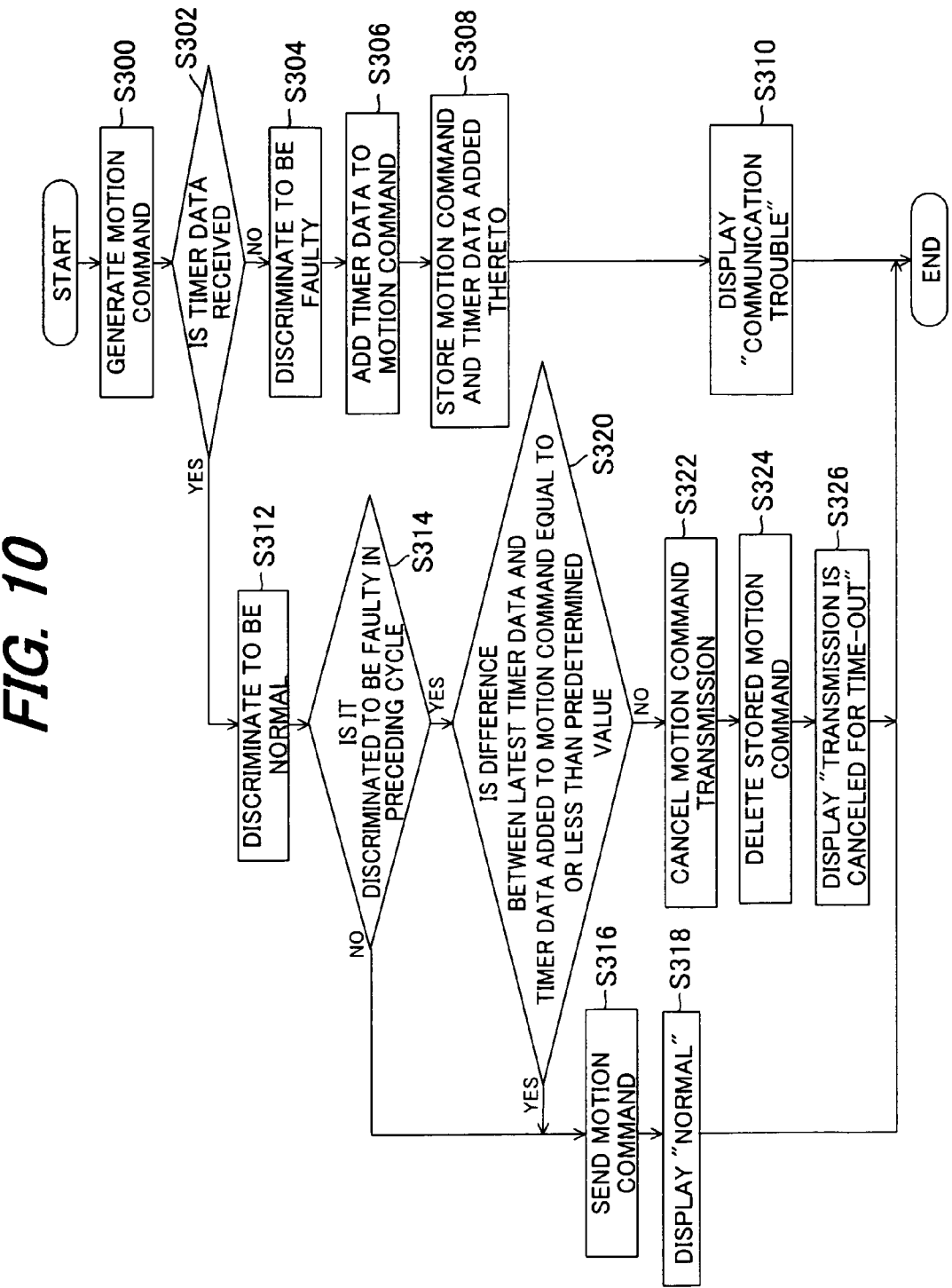
FIG. 10 is a flowchart showing the sending processing of motion command executed by the external terminal shown in FIG. 8.

Next, sending processing of motion command executed by the external terminal 90b will be explained. FIG. 10 is a flowchart showing the processing. The shown program is executed at a predetermined interval.

Explaining the flowchart of FIG. 10, first in S300 (motion command generator 114b), motion command of the robot 10b is generated in response to the operation of the input device 112 by the operator. The program proceeds to S302 (data receiver 120b, transmission discriminator 130), in which it is determined whether timer data is received. Specifically, in the processing of S302, the result is negative when the timer data has not been received continuously over a period exceeding 0.5 sec (not-shortened timer data generating interval), while is affirmative when the timer data is received at every 0.5 sec or 0.1 sec (shortened timer data generating interval).

When the result in S302 is No, the program proceeds to S304 (transmission discriminator 130), in which it is discriminated that the communication condition between the robot 10b and external terminal 90b is faulty (the socket communication is disconnected), and to S306 (transmission discriminator 130), in which latest timer data stored in the data storage 116, i.e., latest timer data received before the communication condition becomes faulty is added to the motion command inputted to the transmission discriminator 130. Then, in S308 (motion command storage 132), the motion command and timer data added thereto are stored (memorized) in the motion command storage 132 and in S310 (display 122b), a notification of "communication trouble" is displayed on the display 122b to inform the operator that the communication condition is faulty.

When the result in S302 is Yes, the program proceeds to S312, in which the communication condition is discriminated to be normal and to S314 (transmission discriminator 130), in which it is determined whether the communication condition was discriminated to be faulty in the preceding cycle. Specifically, it is determined whether the communication has recovered from the faulty condition or stays normal continuously.

When the result in S314 is No (i.e., the condition stays normal), the program proceeds to S316 (transmission discriminator 130, data transmitter 118b), in which the motion command is sent to the robot 10b and to S318 (display 122b), in which a notification of "normal" is displayed on the display 122b. Based on the motion command transmitted in the processing of S316, the motion controller 106b of the robot 10b controls motion of the robot 10b.

When the result in S314 is Yes, the program proceeds to S320 (transmission discriminator 130), in which it is determined whether a difference between a time specified by the timer data added to the motion command (stored in the motion command storage 132) and a time specified by the received latest timer data (i.e., disconnected time period of the communication) is equal to or less than a predetermined value (predetermined time period). In this embodiment, the predetermined value is set to 2.0 sec.

When the result in S320 is Yes, the program proceeds to S316, in which the motion command stored in the motion command storage 132 is transmitted, whereas when the result in S320 is No, proceeds to S322 (transmission discriminator 130), in which transmission of the motion command is canceled and to S324 in which the stored motion command (whose transmission has been canceled) is deleted. Then in S326 (display 122b), a notification of "transmission is canceled for time-out" is displayed to inform the operator of cancellation of the motion command transmission.

Figure 11:
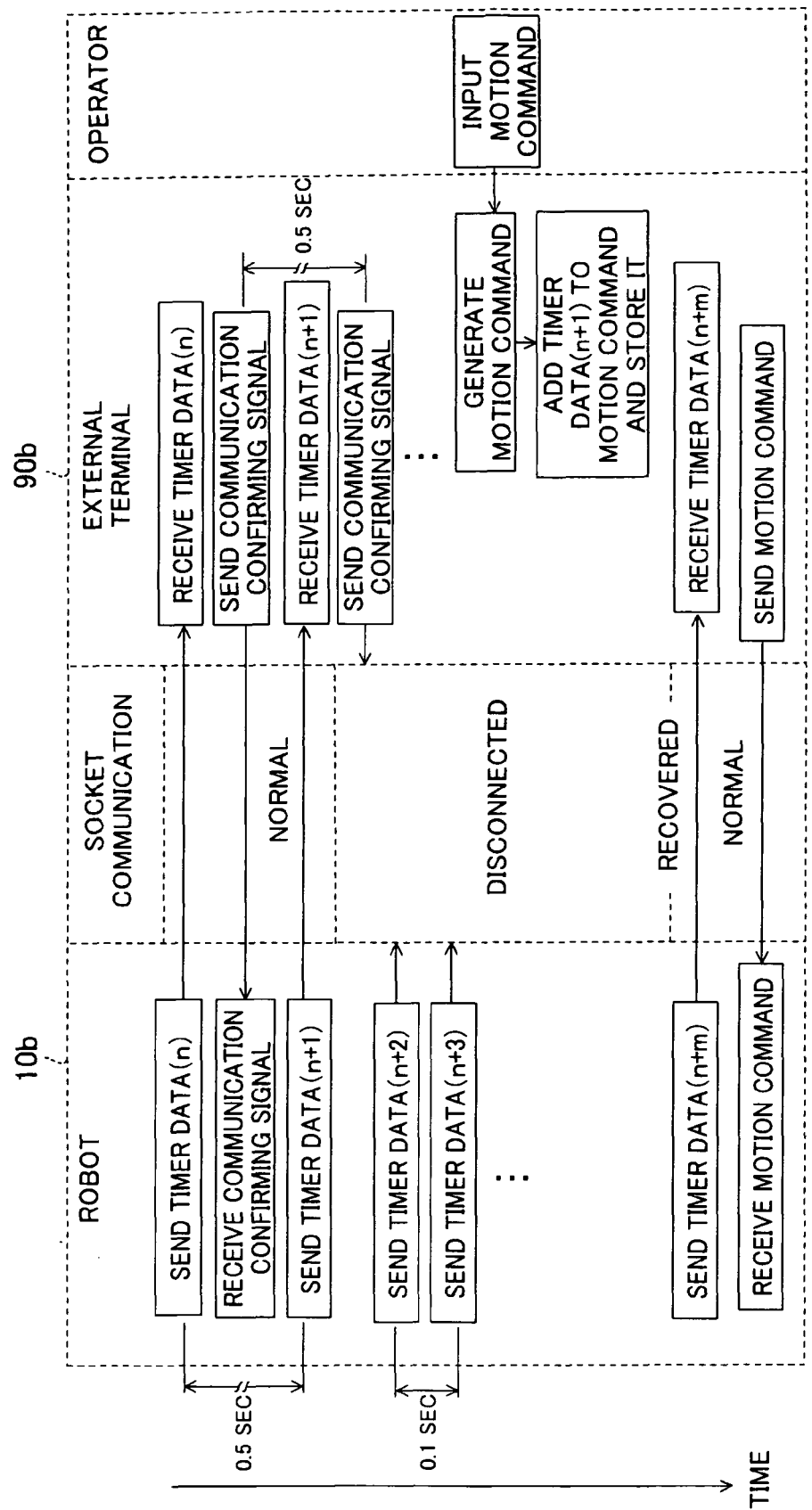
FIG. 11 is a time chart for expressing the sending and receiving processing of the motion command, timer data and communication confirming signal, executed between the robot and external terminal shown in FIG. 8.

The abovementioned processing of the flowcharts in FIGS. 9 and 10 will be again explained in reference to FIG. 11. FIG. 11 is a time chart for expressing the sending and receiving processing of the motion command, timer data and communication confirming signal, executed between the robot 10b and external terminal 90b.

As shown in FIG. 11, timer data sent from the robot 10b is received by the external terminal 90b when the socket communication functions normally. Also, a communication confirming signal sent from the external terminal 90b is received by the robot 10b when the socket communication functions normally.

In contrast, when the socket communication is disconnected, the communication confirming signal sent from the external terminal 90b is not received by the robot 10b. In the case that the communication confirming signal is not received, in the robot 10b, the communication condition is discriminated to be faulty and the timer data generating interval (transmission interval) is shortened from 0.5 sec to 0.1 sec.

When the socket communication is disconnected, the timer data sent from the robot 10b is also not received by the external terminal 90b. In the case that the timer data is not received, in the external terminal 90b, the communication condition is discriminated to be faulty. Motion command generated at the time when the communication condition is discriminated to be faulty is stored in the motion command storage 132 while being added with latest timer data received when the communication condition is normal.

When the socket communication has recovered from disconnection after that, the external terminal 90b receives timer data and discriminates the communication condition to be normal. The external terminal 90b transmits the stored motion command to the robot 10 if a difference between a time specified by the received timer data and a time specified by the timer data added to the stored motion command is equal to or less than a predetermined value (2.0 sec). Meanwhile, if the difference exceeds the predetermined value, transmission of the stored motion command is canceled and the stored motion command is deleted from the motion command storage 132.

Although not illustrated, following the recovery of the socket communication and receipt of the communication confirming signal by the robot 10b, the timer data generating interval of the robot 10 returns from 0.1 sec to 0.5 sec.

Thus, in the mobile robot control system according to the second embodiment of the invention, it is configured to generate timer data sequentially at the timer data generating interval on the robot 10b side and send them to the external terminal 90b. When the timer data is received, the external terminal 90b discriminates that the communication condition is normal, while, when not received, it discriminates that the communication condition is faulty and stores motion command with timer data. When the external terminal 90b receives timer data after recovery of the communication, based on the timer data added to the stored motion command and the received latest timer data, it is determined whether the stored motion command should be sent to the mobile robot. In other words, it is configured such that, when a difference between the timer data added to the motion command and the received latest timer data (i.e., disconnected time period of the communication) exceeds a predetermined value, transmission of the stored motion command is canceled. With this, it becomes possible to prevent the robot 10 from suddenly starting to move at the time when the communication between the external terminal 90b and robot 10b has recovered from disconnection, thereby enabling to avoid making the operator feel unnatural.

Further, since it is configured to delete the motion command whose transmission has been canceled, it becomes possible to prevent a storage area of the motion command storage 132 from being unnecessarily consumed.

Furthermore, it is configured such that the communication confirming signal is generated in the external terminal 90b at the communication confirming signal generating interval and forwarded to the robot 10b, the robot 10b discriminates that the communication condition is normal when the communication confirming signal is received, while it discriminates that the communication condition is faulty when the communication confirming signal is not received, and based on the discrimination result, the communication confirming signal generating interval is changed, specifically, when the communication condition is discriminated to be faulty, the second predetermined time interval is shortened. With this, when the communication between the external terminal 90b and robot 10b has recovered from disconnection, it is possible to promptly determine whether the motion command should be forwarded to the robot 10b.

The remaining configuration is the same as that in the first embodiment, so the explanation will not be made.

As stated above, the first embodiment is configured to have a system for controlling a mobile robot (10) having an external terminal (90) that generates motion command and transmits it to the robot, and controlling means (motion controller 106; S110, S116 of FIG. 6 flowchart) provided at the robot for controlling operation of the robot based on the transmitted motion command, characterized in that: the robot is provided with time-series data generating means (timer data generator 108, data transmitter 110; S10, S18 of FIG. 5 flowchart) for generating time-series data (timer data) sequentially at a predetermined time interval (timer data generating interval) and for transmitting them to the external terminal; and the external terminal is provided with time-series data adding means (motion command generator 114, data storage 116, data receiver 120; S20, S22 of FIG. 5 flowchart, S102 of FIG. 6 flowchart) for receiving the transmitted time-series data and for adding them to the motion command; and the controlling means determines the motion of the robot based on the generated time-series data and the time-series data added to the motion command (S108, S110, S116 of FIG. 6 flowchart), and controls the motion of the robot in accordance with the transmitted motion command when a difference between a current one of the time-series data generated by the time-series data generating means and the time-series data added to the motion command is equal to or smaller than a predetermined value (S110 of FIG. 6 flowchart), and discontinues the motion of the robot when the difference is greater than the predetermined value (S116 of FIG. 6 flowchart).

The second embodiment is configured to have a system for controlling a mobile robot (10b) having an external terminal (90b) that generates motion command and transmit it to the robot, and controlling means (motion controller 106b) provided at the robot for controlling operation of the robot based on the transmitted motion command, characterized in that: the robot is provided with time-series data generating means (timer data generator 108b, data transmitter 110b; S212, S220 of FIG. 9 flowchart) for generating time-series data (timer data) sequentially at a predetermined time interval (timer data generating interval) and for transmitting them to the external terminal; and the external terminal is provided with time-series data storing means (data storage 116b, data receiver 120b; S222, S224 of FIG. 9 flowchart) for receiving the transmitted time-series data and storing them; communication condition discriminating means (transmission discriminator 130: S302, S304, S312 of FIG. 10 flowchart) for discriminating that communication condition between the external terminal and the robot is normal when the transmitted time-series data are received, and for discriminating that the communication condition is faulty when the transmitted time-series data are not received; motion command storing means (transmission discriminator 130, motion command storage 132; S306, S308 of FIG. 10 flowchart) for storing the motion command by adding the stored transmitted time-series data thereto, when the communication condition discriminating means discriminates that the communication condition is faulty; and transmission determining means (transmission discriminator 130; S320, S316, S322 of FIG. 10 flowchart) for determining as to whether the stored motion command should be transmitted to the robot based on the time-series data added to the stored motion command and a current one of the received time-series data, when the communication condition discriminating means discriminates that the communication condition is normal.

It is configured such that the transmission determining means determines that the transmission of the stored motion command should be discontinued, when a difference between the time-series data added to the motion command and the current one of the received time-series data is greater than a predetermined value (S322 of FIG. 10 flowchart).

It is configured such that the external terminal further includes: motion command deleting means (transmission discriminator 130; S324 of FIG. 10 flowchart) for deleting the motion command whose transmission was discontinued.

It is configured such that the external terminal further includes: signal generating means (communication confirming signal generator 134, data transmitter 118b; S200, S202 of FIG. 9 flowchart) for generating a communication confirming signal at a predetermined second time interval (communication confirming signal generating interval) and send it to the robot; and the robot includes: second communication condition discriminating means (motion controller 106b; S204, S206, S210 of FIG. 9 flowchart) for discriminating that the communication condition is normal when the transmitted communication confirming signal is received, and for discriminating that the communication condition is faulty when the transmitted communication confirming signal is not received; and time interval changing means (motion controller 106b; S208 of FIG. 9 flowchart) for changing the predetermined second time interval based on discrimination result of the second communication condition discriminating means.

It is configured such that the time interval changing means shortens the predetermined second time interval when the second communication condition discriminating means discriminates that the communication condition is faulty (motion controller 106b; S208 of FIG. 9 flowchart).

It is configured such that the robot (10, 10b) further includes: positional information generating means (self-information generator 104) for generating positional information (position data) of the robot and transmitting it to the external terminal (90, 90b); and the external terminal includes: displaying means (display 122, 122b) for receiving the transmitted positional information and for displaying it.

It is configured such that the robot comprises a humanoid robot having a body (14), two legs (12L, 12R) connected to the body and two arms (20L, 20R) connected to the body, that moves by driving the legs.

It should be noted in the foregoing that, although a biped humanoid robot is disclosed as an example of the mobile robot, this invention can be applied to the robot having one leg, three or more legs, and also to a wheel or crawler type mobile robot.

It should be also noted that, although the robot 10(10b) and external terminal 90(90b) are configured to be freely communicated by radio, it may be wire communication. Also, a transmission method other than the socket communication can be utilized.

INDUSTRIAL APPLICABILITY

According to this invention, in the mobile robot control system, it is configured to generate time-series data sequentially at the predetermined interval on the robot side and send it to the external terminal, then, on the external terminal side, receive the time-series data and add it to motion command for the robot, whereafter, on the robot side, receive the motion command added with the time-series data. Based on the generated time-series data and the time-series data added to the motion command, motion of the robot is determined, and the motion of the robot is controlled in accordance with the transmitted motion command when a difference between a current one of the time-series data generated by the time-series data generating means and the time-series data added to the motion command is equal to or smaller than a predetermined value, and the motion of the robot is discontinued when the difference is greater than the predetermined value. With this, it becomes possible to prevent the robot from suddenly starting to move at the time when the communication between the external terminal which is a transmitting source of the motion command and the robot has recovered from disconnection, thereby enabling to avoid making the operator feel unnatural.

The invention claimed is:

1. A system for controlling a mobile robot having an external terminal that generates motion command and transmits it to the robot, and controlling means provided at the robot for controlling operation of the robot based on the transmitted motion command, wherein:

the robot includes
a. means for generating time-series data sequentially at a predetermined time interval and for transmitting them to the external terminal;

and the external terminal is provided with
b. means for receiving the transmitted time-series data and for adding them to the motion command;

and wherein the controlling means determines the motion of the robot based on the generated time-series data and the time-series data added to the motion command, and controls the motion of the robot in accordance with the transmitted motion command when a difference between a current one of the time-series data generated by the time-series data generating means and the time-series data added to the motion command is equal to or smaller than a predetermined value, and discontinues the motion of the robot when the difference is greater than the predetermined value.

2. A system for controlling a mobile robot having an external terminal that generates motion command and transmit it to the robot, and controlling means provided at the robot for controlling operation of the robot based on the transmitted motion command, wherein:

the robot includes
a. means for generating time-series data sequentially at a predetermined time interval and for transmitting them to the external terminal;

and the external terminal is provided with
b. means for receiving the transmitted time-series data and storing them;
c. means for discriminating that communication condition between the external terminal and the robot is normal when the transmitted time-series data are received, and for discriminating that the communication condition is faulty when the transmitted time-series data are not received;
d. means for storing the motion command by adding the stored transmitted time-series data thereto, when the communication condition discriminating means discriminates that the communication condition is faulty; and
e. means for determining as to whether the stored motion command should be transmitted to the robot based on the time-series data added to the stored motion command and a current one of the received time-series data, when the communication condition discriminating means discriminates that the communication condition is normal.

3. The system according to claim 2, wherein the transmission determining means determines that the transmission of the stored motion command should be discontinued, when a difference between the time-series data added to the motion command and the current one of the received time-series data is greater than a predetermined value.

4. The system according to claim 3, wherein the external terminal further includes:
- f. means for deleting the motion command whose transmission was discontinued.

5. The system according to claim 3, wherein the external terminal further includes:
- g. signal generating means for generating a communication confirming signal at a predetermined second time interval and send it to the robot;

and wherein the robot includes:
- h. means for discriminating that the communication condition is normal when the transmitted communication confirming signal is received, and for discriminating that the communication condition is faulty when the transmitted communication confirming signal is not received; and
- i. means for changing the predetermined second time interval based on discrimination result of the second communication condition discriminating means.

6. The system according to claim 4, wherein the external terminal further includes:
- g. means for generating a communication confirming signal at a predetermined second time interval and send it to the robot;

and the robot includes:
- h. means for discriminating that the communication condition is normal when the transmitted communication confirming signal is received, and for discriminating that the communication condition is faulty when the transmitted communication confirming signal is not received; and
- i. means for changing the predetermined second time interval based on discrimination result of the second communication condition discriminating means.

7. The system according to claim 5, wherein the time interval changing means is configured to shorten the predetermined second time interval when the second communication condition discriminating means discriminates that the communication condition is faulty.

8. The system according to claim 6, wherein the time interval changing means is configured to shorten the predetermined second time interval when the second communication condition discriminating means discriminates that the communication condition is faulty.

9. The system according to claim 1, wherein the robot further includes:
- j. means for generating positional information of the robot and transmitting it to the external terminal;

and the external terminal includes:
- k. means for receiving the transmitted positional information and for displaying it.

10. The system according to claim 2, wherein the robot further includes:
- j. means for generating positional information of the robot and transmitting it to the external terminal;

and the external terminal includes:
- k. means for receiving the transmitted positional information and for displaying it.

11. The robot according to claim 1, wherein the robot comprises a humanoid robot having a body, two legs connected to the body and two arms connected to the body, that moves by driving the legs.

12. The robot according to claim 2, wherein the robot comprises a humanoid robot having a body, two legs connected to the body and two arms connected to the body, that moves by driving the legs.

* * * * *